United States Patent
Kim et al.

(10) Patent No.: US 12,493,325 B2
(45) Date of Patent: Dec. 9, 2025

(54) DISPLAY DEVICE

(71) Applicant: SAMSUNG DISPLAY CO., LTD., Yongin-si (KR)

(72) Inventors: Kyung-Man Kim, Gyeonggi-do (KR); Chan-Jae Park, Gyeonggi-do (KR); Sunok Oh, Gyeonggi-do (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 177 days.

(21) Appl. No.: 18/340,661

(22) Filed: Jun. 23, 2023

(65) Prior Publication Data

US 2024/0103583 A1    Mar. 28, 2024

(30) Foreign Application Priority Data

Sep. 22, 2022 (KR) .................. 10-2022-0119862

(51) Int. Cl.
  *G06F 1/16* (2006.01)
  *D03D 15/25* (2021.01)
  *D03D 15/267* (2021.01)
  *D03D 15/275* (2021.01)

(52) U.S. Cl.
  CPC ........... *G06F 1/1656* (2013.01); *D03D 15/25* (2021.01); *D03D 15/267* (2021.01); *D03D 15/275* (2021.01); *G06F 1/1616* (2013.01); *G06F 1/1652* (2013.01)

(58) Field of Classification Search
  CPC .... G06F 1/1656; G06F 1/1616; G06F 1/1652; G06F 1/1637; D03D 15/25; D03D 15/267; D03D 15/275; D03D 1/0058; D03D 1/0088; D03D 13/004; D03D 13/006; D10B 2101/06; D10B 2101/12; D10B 2101/20; D10B 2401/16; D10B 2401/18; H10K 50/84; H10K 77/111; H10K 2102/311
  See application file for complete search history.

(56) References Cited

U.S. PATENT DOCUMENTS

| | | | | |
|---|---|---|---|---|
| 9,348,362 B2* | 5/2016 | Ko | ........................ | G06F 1/1601 |
| 9,639,121 B2* | 5/2017 | Min | ....................... | H05K 1/038 |
| 9,851,759 B2* | 12/2017 | Tazbaz | ................... | G06F 1/163 |
| 10,317,947 B2* | 6/2019 | Park | ...................... | G06F 1/1652 |
| 10,683,591 B1* | 6/2020 | Podhajny | ............... | D03D 11/02 |
| 11,009,921 B1* | 5/2021 | Bharadwaj | ............ | G06F 1/1694 |
| 11,392,180 B1* | 7/2022 | Yates | ..................... | G06F 1/1652 |
| 11,570,910 B2* | 1/2023 | Kim | ........................ | H05K 5/03 |
| 11,895,255 B2* | 2/2024 | Lee | ..................... | H04M 1/0268 |

(Continued)

FOREIGN PATENT DOCUMENTS

| | | |
|---|---|---|
| KR | 10-2015-0004679 | 1/2015 |
| KR | 10-2051803 | 11/2019 |

(Continued)

*Primary Examiner* — Rockshana D Chowdhury
(74) *Attorney, Agent, or Firm* — F. CHAU & ASSOCIATES, LLC

(57) ABSTRACT

A display device includes a display panel that includes a foldable area and a non-foldable area adjacent to the foldable area, and a first support member disposed under the display panel. The first support member includes a fabric that includes a flexible portion that overlaps the foldable area and a rigid portion that overlaps the non-foldable area. The rigid portion is woven differently from the flexible portion and contains fiber reinforced plastic.

20 Claims, 12 Drawing Sheets

(56) References Cited

U.S. PATENT DOCUMENTS

| | | | |
|---|---|---|---|
| 11,899,493 B2* | 2/2024 | Kishimoto | G06F 1/1652 |
| 12,162,255 B2* | 12/2024 | Cheng | B32B 3/14 |
| 12,174,371 B2* | 12/2024 | Park | G02B 27/0081 |
| 12,197,251 B2* | 1/2025 | Luo | G06F 1/1652 |
| 12,213,267 B2* | 1/2025 | Hale | E05D 3/122 |
| 12,228,969 B2* | 2/2025 | Huang | G06F 1/1616 |
| 2010/0007942 A1* | 1/2010 | Oikawa | G02F 1/1679 359/296 |
| 2010/0208445 A1* | 8/2010 | Asvadi | H05K 1/189 442/206 |
| 2015/0029652 A1* | 1/2015 | Min | H05K 1/0278 361/679.27 |
| 2016/0179253 A1* | 6/2016 | Franklin | H10K 77/111 345/174 |
| 2016/0187935 A1* | 6/2016 | Tazbaz | G06F 1/1616 361/679.55 |
| 2017/0102738 A1* | 4/2017 | Park | G06F 3/04883 |
| 2021/0018961 A1* | 1/2021 | Han | G06F 1/1681 |
| 2021/0400852 A1* | 12/2021 | Kim | G06F 1/1641 |
| 2023/0047392 A1* | 2/2023 | Min | G06F 1/1652 |
| 2023/0176612 A1* | 6/2023 | Tyagi | G06F 1/1616 |
| 2023/0292455 A1* | 9/2023 | Caplow-Munro | H04M 1/022 |
| 2024/0083137 A1* | 3/2024 | Qin | H10K 59/871 |
| 2024/0103583 A1* | 3/2024 | Kim | D03D 15/25 |
| 2024/0155048 A1* | 5/2024 | Meng | G06F 1/1658 |
| 2024/0365653 A1* | 10/2024 | Hamburgen | H10K 71/50 |

FOREIGN PATENT DOCUMENTS

| | | |
|---|---|---|
| KR | 10-2019-0141434 | 12/2019 |
| KR | 10-2021-0011555 | 2/2021 |

* cited by examiner

DISPLAY DEVICE

CROSS-REFERENCE TO RELATED APPLICATION

This application claims priority under 35 U.S.C. § 119 from Korean Patent Application No. 10-2022-0119862, filed on Sep. 22, 2022 in the Korean Intellectual Property Office (KIPO), the contents of which are herein incorporated by reference in their entirety.

TECHNICAL FIELD

Embodiments of the disclosure are directed to a display device. More particularly, embodiments are directed to a foldable display device.

DISCUSSION OF THE RELATED ART

As information technology develops, the importance of display devices that communicate information to users, increases. Accordingly, the use of display devices, such as a liquid crystal display device, an organic light emitting display device, a plasma display device, etc., is increasing.

Recently, a flexible display device has been developed in which a lower substrate and an upper substrate of a display panel of the display device includes a flexible material, and a portion of the display panel can be bent or folded. For example, the lower substrate of the display panel may be formed of a polyimide substrate, and the upper substrate of in the display panel may have a thin film encapsulation structure.

SUMMARY

Embodiments provide a display device with increased surface quality of a foldable area.

A display device according to embodiments of the present disclosure includes a display panel that includes a foldable area and a non-foldable area adjacent to the foldable area, and a first support member disposed under the display panel. The first support member includes a fabric that includes a flexible portion that overlaps the foldable area, and a rigid portion that overlaps the non-foldable area. The rigid portion is woven differently from the flexible portion and contains fiber reinforced plastic.

In an embodiment, the fabric includes a plurality of weft yarns and a plurality of warp yarns that extend across the weft yarns. The weft yarns and the warp yarns are composed of yarn.

In an embodiment, an extension direction of at least one of the weft yarns or the warp yarns of the flexible portion differs from an extension direction of at least one of the weft yarns or the warp yarns of the rigid portion.

In an embodiment, each of the weft yarns of the rigid portion extends in a first direction and each of the warp yarns of the rigid portion extends in a second direction that crosses the first direction. Each of the weft yarns of the flexible portion extends in a first diagonal direction between the first direction and the second direction, and each of the warp yarns of the flexible portion extends in a second diagonal direction that crosses the first diagonal direction.

In an embodiment, an extension direction of each of the weft yarns and the warp yarns of the flexible portion is a same as an extension direction of each of the weft yarns and the warp yarns of the rigid portion.

In an embodiment, the foldable area has a folding line that extends in a first direction and the non-foldable area is adjacent to the foldable area in a second direction that crosses the first direction. Each of the weft yarns of the flexible portion and the rigid portion extends in a first diagonal direction between the first direction and the second direction, and each of the warp yarns of the flexible portion and the rigid portion extends in a second diagonal direction that crosses the first diagonal direction.

In an embodiment, the fabric further includes a coating layer that surrounds at least one weft yarn or at least one warp yarn using a metal fiber and includes a polymer.

In an embodiment, the display device further includes a fixing structure disposed adjacent to the first support member and connected to both ends of each of the warp yarns.

In an embodiment, the fixing structure includes a spring.

In an embodiment, the fabric includes at least one of a glass fiber, a carbon fiber, or a metal fiber.

In an embodiment, each of the flexible portion and the rigid portion has a single-layer structure or a multi-layer structure.

In an embodiment, each of the flexible portion and the rigid portion is woven with at least one of a plain weave, a twill weave, a satin weave, a basket weave, or a mock leno weave.

In an embodiment, the flexible portion is woven in the satin weave and the rigid portion is woven in the plain weave.

In an embodiment, the rigid portion includes one of a carbon fiber reinforced plastic or a glass fiber reinforced plastic.

In an embodiment, the display device further includes a second support member disposed under the first support member. The second support member overlaps the non-foldable area and includes a first support layer and second support layer spaced apart from each other.

A display device according to embodiments of the present disclosure includes a display panel that includes a foldable area and a non-foldable area adjacent to the foldable area, and a first support member disposed under the display panel. The first support member includes a fabric that includes a flexible portion that overlaps the foldable area and a rigid portion that overlaps the non-foldable area and contains fiber reinforced plastic.

In an embodiment, the fabric includes a plurality of weft yarns and a plurality of warp yarns that extend across the weft yarns. The weft yarns and the warp yarns are composed of yarn.

In an embodiment, an extension direction of at least one of the weft yarns or the warp yarns of the flexible portion differs from an extension direction of at least one of the weft yarns or the warp yarns of the rigid portion.

In an embodiment, each of the flexible portion and the rigid portion is woven with at least one of a plain weave, a twill weave, a satin weave, a basket weave, or a mock leno weave.

In an embodiment, the fabric includes at least one of a glass fiber, a carbon fiber, or a metal fiber.

A display device according to an embodiment of the present disclosure includes a display panel that includes a foldable area and a non-foldable area adjacent to the foldable area, and a first support member disposed under the display panel. The first support member includes a fabric that includes: a flexible portion that overlaps the foldable area, and a rigid portion that overlaps the non-foldable area. The rigid portion is woven differently from the flexible portion and contains fiber reinforced plastic. Accordingly, surface quality of the display device is increased. In addition, since the first support member is formed of a fabric, the manufacturing process of the display device is simplified.

DETAILED DESCRIPTION

Figure 1:
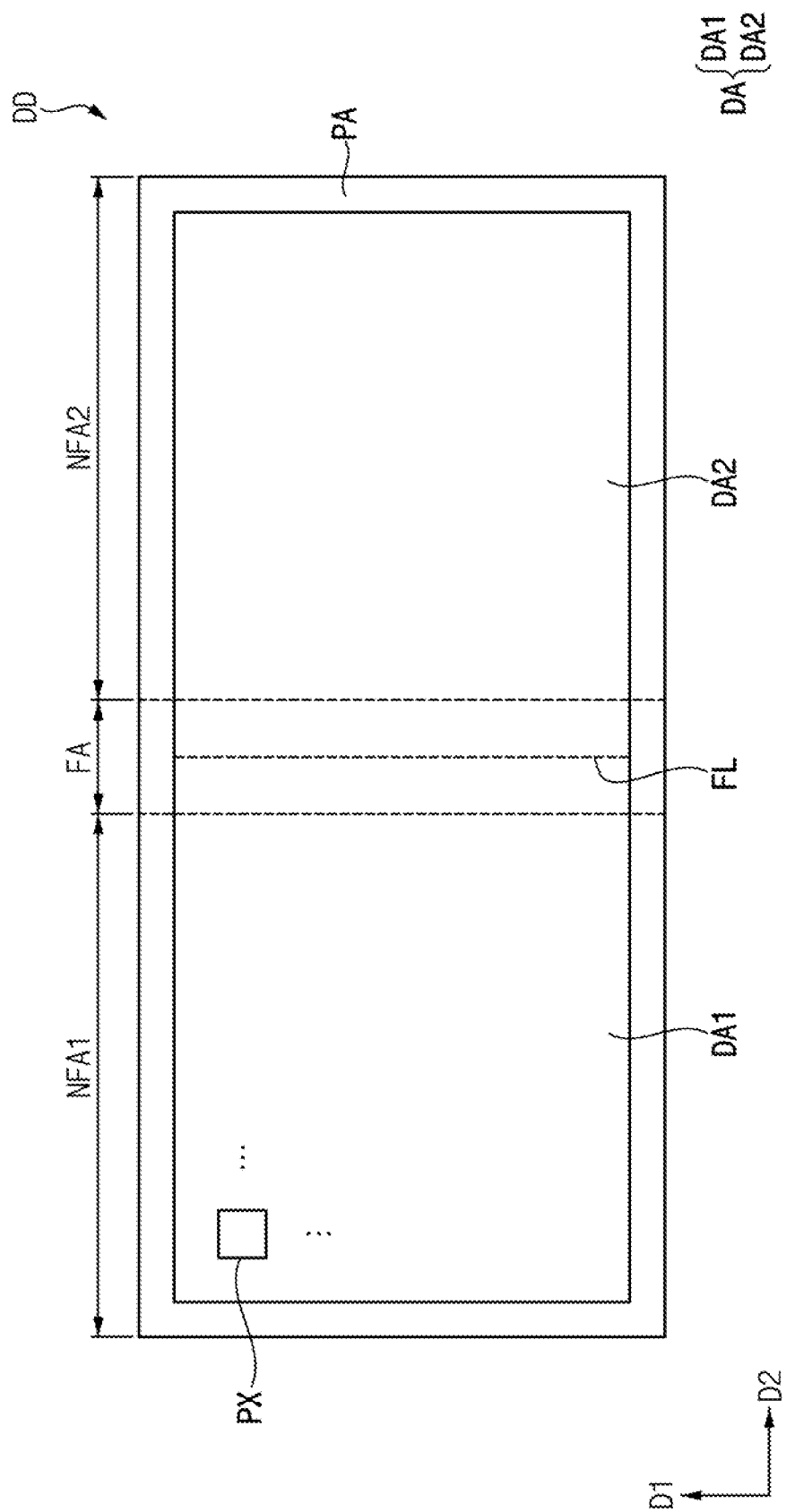
FIG. 1 is a plan view of a display device according to an embodiment of the present disclosure.

Hereinafter, a display device according to embodiments of the present disclosure will be described in detail with reference to the accompanying drawings. The same reference numerals may be used for the same components in the drawings, and redundant descriptions of the same components may be omitted.

Figure 2:
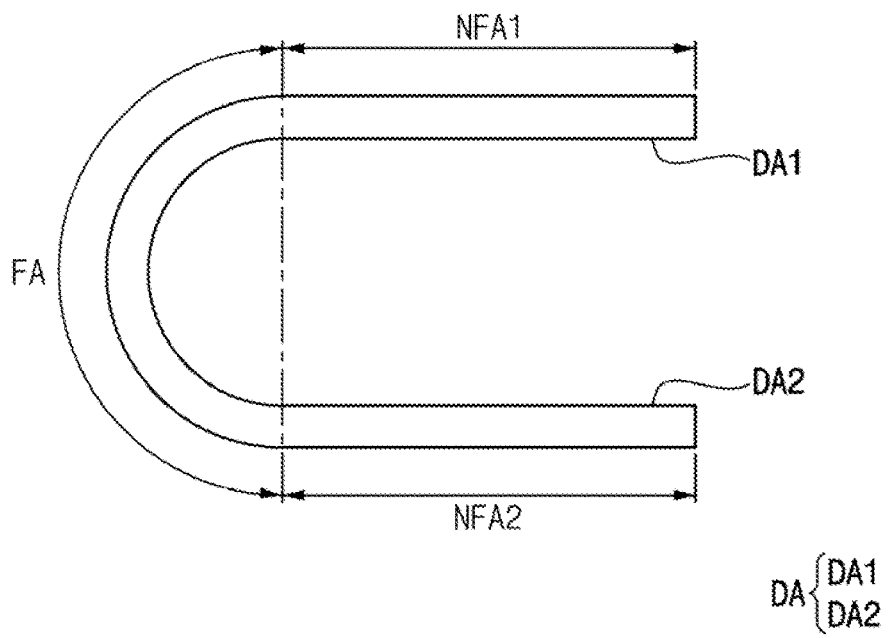
FIGS. 2 and 3 are cross-sectional views of a folded state of a display device of FIG. 1.
Figure 3:
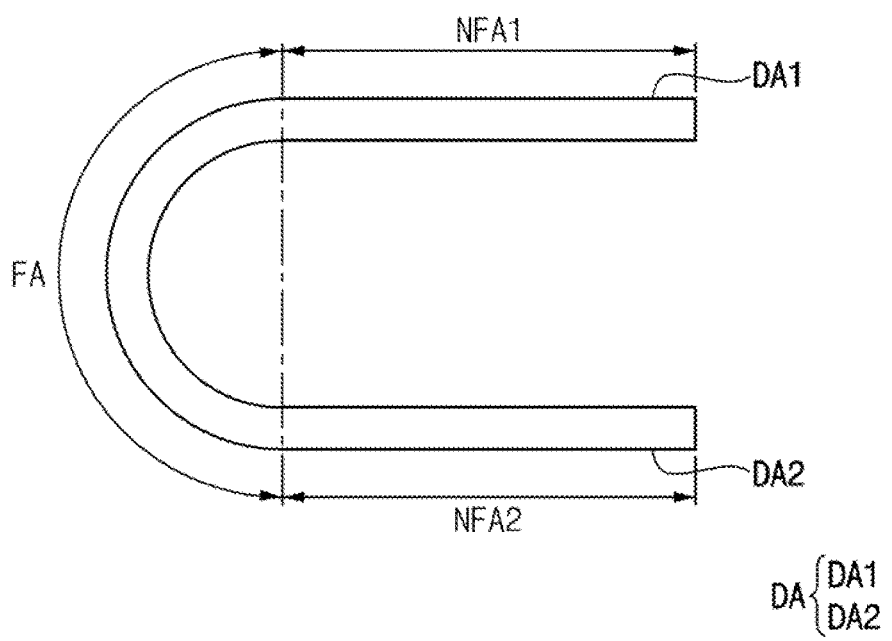

FIG. 1 is a plan view of a display device according to an embodiment of the present disclosure. FIGS. 2 and 3 are cross-sectional views of a folded state of a display device of FIG. 1.

Referring to FIGS. 1, 2, and 3, a display device DD according to an embodiment of the present disclosure includes a display area DA and a peripheral area PA. The peripheral area PA is located around the display area DA. For example, the peripheral area PA surrounds at least a portion of the display area DA.

A plurality of pixels PX are disposed in the display area DA. Each of the pixels PX emits light. As each of the plurality of pixels PX emits light, the display area DA can display an image. For example, each of the plurality of pixels PX includes a transistor and a light emitting element electrically connected to the transistor.

The plurality of pixels PX are repeatedly arranged along a first direction D1 and a second direction D2 that crosses the first direction D1 in a plan view. For example, the first direction D1 is perpendicular to the second direction D2. A plane is defined in the first direction D1 and the second direction D2.

A driver is disposed in the peripheral area PA. The driver provides signals and/or voltages to the plurality of pixels PX. For example, the driver includes a data driver, a gate driver, etc. The peripheral area PA does not display an image.

At least a portion of the display device DD is flexible, and the flexible portion, such as a foldable area FA, can be folded. For example, the display area DA includes the foldable area FA that can be bent by an external force to fold the display device DD and non-foldable areas NFA1 and NFA2 adjacent to at least one side of the foldable area FA. For example, the foldable area FA includes a folding line FL that extends along the first direction D1. Here, the expression "non-foldable area" is used for convenience of description. The expression "non-foldable" includes not only a non-flexible hard case but also a flexible non-foldable case.

The display area DA is divided into a first display area DA1 and a second display area DA2 that are adjacent in the second direction D2. The first display area DA1 and the second display area DA2 are continuously connected and substantially form one display area DA. For example, when the display area DA is folded along the folding line FL, as shown in FIG. 2, the display device DD has an in-folded structure so that the first display area DA1 and the second display area DA2 face each other. Alternatively, when the display area DA is folded along the folding line FL, as shown in FIG. 3, the display device DD has an out-folded structure in which the first display area DA1 and the second display area DA2 face outwards.

In addition, the display device DD according to an embodiment of the present disclosure is not limited to having one foldable area. In an embodiment, the display device DD can be folded multiple times or has a plurality of foldable areas to implement a rollable display device.

Figure 4:
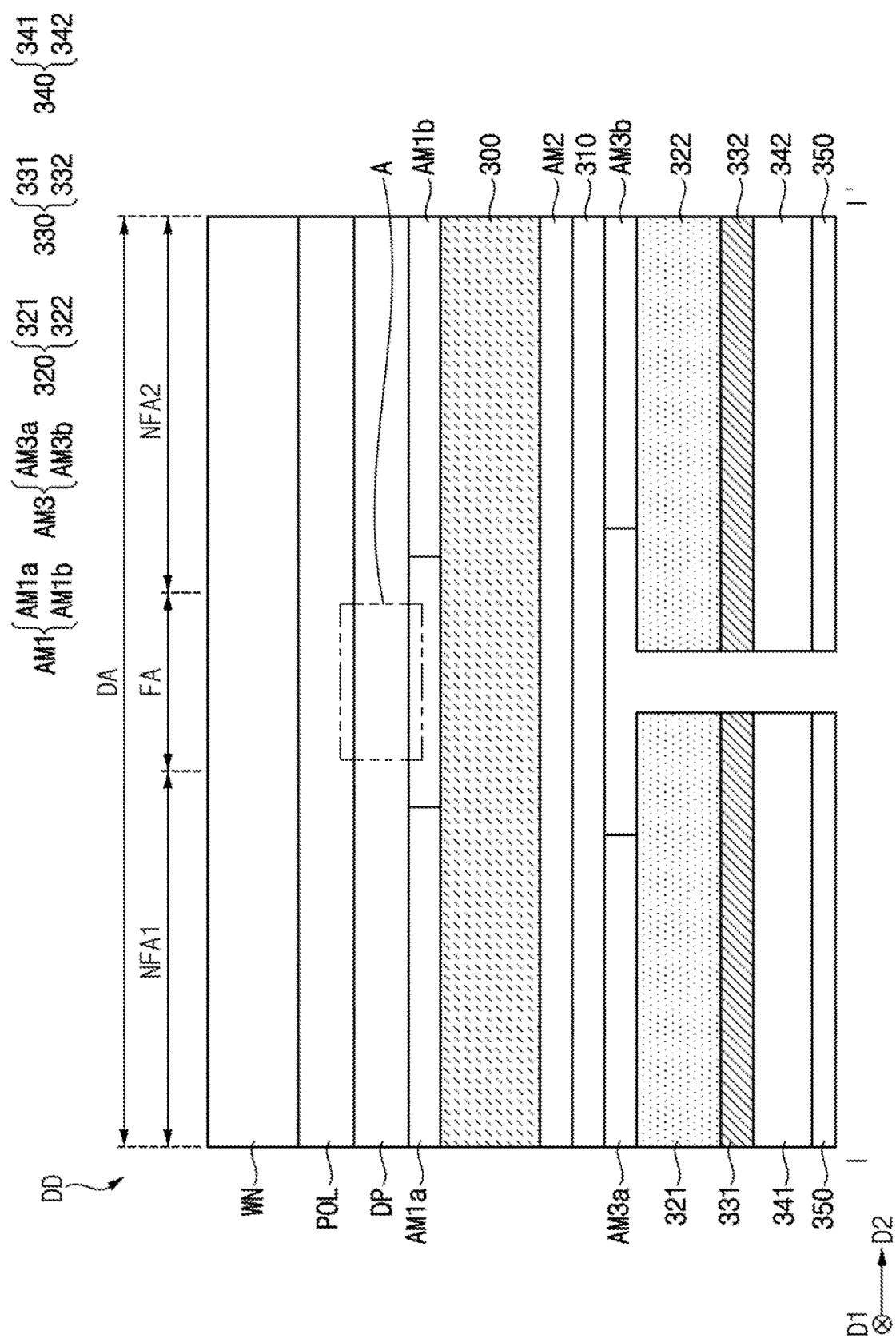
FIG. 4 is a cross-sectional view of the display device of FIG. 1.

FIG. 4 is a cross-sectional view of a display device of FIG. 1.

Referring to FIG. 4, the display device DD according to an embodiment includes a window member WN, a polarization member POL, a display panel DP, a first adhesive member AM1, a first support member 300, a second adhesive member AM2, an elastic member 310, a third adhesive member AM3, a second support member 320, a heat dissipation member 330, a shock absorbing member 340, and an insulating member 350.

As described above, the display device DD includes the foldable area FA and the non-foldable areas NFA1 and NFA2. Since the display device DD includes the foldable area FA and the non-foldable areas NFA1 and NFA2, components, such as the display panel DP, in the display device DD include the foldable area FA and the non-foldable areas NFA1 and NFA2.

The polarization member POL is disposed on the display panel DP. The display panel DP includes a plurality of pixels, such as the pixels PX of FIG. 1, that generate light. The polarization member POL blocks external light incident on the display panel DP. In an embodiment, the polarization member POL is omitted, and a color filter and a black matrix are disposed on the display panel DP.

The window member WN is disposed on the polarization member POL. The window member WN has a transmission portion that corresponds to the display area DA. For example, the window member WN includes a polymer material or a thin glass film to be bendable. These may be used alone or in combination with each other.

The first adhesive member AM1 is disposed between the display panel DP and the first support member 300. The first adhesive member AM1 includes a first adhesive layer AM1a and a second adhesive layer AM1b that are spaced apart from each other. For example, the first adhesive layer AM1a and the second adhesive layer AM1b are spaced apart from each other in the second direction D2. In an embodiment, neither of the first adhesive layer AM1a and the second adhesive layer AM1b overlaps the foldable area FA. In an embodiment, each of the first adhesive layer AM1a and the second adhesive layer AM1b partially overlaps the foldable area FA.

An upper surface of the first adhesive member AM1 directly contacts the display panel DP, and a lower surface of the first adhesive member AM1 directly contacts the first support member 300. Accordingly, the first adhesive member AM1 attaches the display panel DP and the first support member 300 to each other.

For example, the first adhesive member AM1 includes at least one of an optical clear adhesive ("OCA"), a pressure sensitive adhesive ("PSA"), a photocurable resin, or a thermosetting resin, etc. These may be used alone or in combination with each other.

The first support member 300 is disposed under the display panel DP. A portion of the first support member 300 that overlaps the foldable area FA is elastic for folding and unfolding the display device DD. A detailed description of the first support member 300 will be provided below.

The first support member 300 supports the display panel DP. In addition, the first support member 300 assists folding of the display panel DP. For example, the first support member 300 supports the display panel DP by being disposed on the entire lower surface of the display panel DP, and the portion of the first support member 300 that overlaps the foldable area FA helps fold the display panel DP.

The elastic member 310 is disposed under the first support member 300. For example, the elastic member 310 is disposed between the first support member 300 and the second support member 320. The elastic member 310 overlaps the foldable area FA. When the display device DD is repeatedly folded and unfolded, the elastic member 310 prevents foreign matter from penetrating into a portion of the first support member 300 that overlaps the foldable area FA. In addition, when the display device DD is repeatedly folded and unfolded, the elastic member 310 stretches and contracts so as not to expose a portion of the first support member 300 that overlaps the foldable area FA.

For example, the elastic member 310 includes an elastic polymer that has a relatively large elastic force or a relatively large restoring force. For example, the elastic member 310 includes an elastic material such as one of silicone, urethane, or thermoplastic polyurethane ("TPU"), etc. These may be used alone or in combination with each other.

The second adhesive member AM2 is disposed between the first support member 300 and the elastic member 310. An upper surface of the second adhesive member AM2 directly contacts the first support member 300 and a lower surface of the second adhesive member AM2 directly contacts the elastic member 310. Accordingly, the second adhesive member AM2 attaches the first support member 300 and the elastic member 310 to each other.

The third adhesive member AM3 is disposed between the elastic member 310 and the second support member 320. The third adhesive member AM3 includes a third adhesive layer AM3a and a fourth adhesive layer AM3b that are spaced apart from each other. For example, the third adhesive layer AM3a and the fourth adhesive layer AM3b are spaced apart from each other in the second direction D2. Neither of the third adhesive layer AM3a and the fourth adhesive layer AM3b overlaps the foldable area FA. The third adhesive layer AM3a attaches the elastic member 310 to the first support layer 321 of the second support member 320, and the fourth adhesive layer AM3b attaches the elastic member 310 to the second support layer 322 of the second support member 320.

Each of the second adhesive member AM2 and the third adhesive member AM3 includes at least one of an optically transparent adhesive, a pressure-sensitive adhesive, a photocurable resin, or a thermosetting resin, etc. These may be used alone or in combination with each other.

The second support member 320 is disposed below the elastic member 310. The second support member 320 includes a first support layer 321 and a second support layer 322 that are spaced apart from each other. For example, the first support layer 321 and the second support layer 322 are spaced apart from each other in the second direction D2. Each of the first support layer 321 and the second support layer 322 partially overlaps the foldable area FA.

For example, when the display device DD is folded, a distance between the first support layer 321 and the second support layer 322 increases. The second support member 320 prevents a portion of the first support member 300 that overlaps the foldable area FA from being pressed.

The second support member 320 includes at least one of metal, glass, or plastic, etc. In an embodiment, the second support member 320 includes stainless steel ("SUS"). In some embodiments, the second support member 320 includes at least one of glass fiber reinforced plastic ("GFRP") or carbon fiber reinforced plastic ("CFRP"), etc. These may be used alone or in combination with each other. However, embodiments of the present disclosure are not necessarily limited thereto, and in other embodiments, the second support member 320 includes other materials.

The heat dissipation member 330 is disposed under the second support member 320. The heat dissipation member 330 includes a first heat dissipation layer 331 and a second heat dissipation layer 332 that are spaced apart from each other. For example, the first heat dissipation layer 331 and the second heat dissipation layer 332 are spaced apart from each other in the second direction D2. An upper surface of the first heat dissipation layer 331 directly contacts the first support layer 321, and an upper surface of the second heat dissipation layer 332 directly contacts the second support layer 322. Each of the first heat dissipation layer 331 and the second heat dissipation layer 332 partially overlaps the foldable area FA. The heat dissipation member 330 includes a material having high thermal conductivity. For example, the heat dissipation member 330 includes one or more of aluminum ("Al") or copper ("Cu"), etc. These may be used alone or in combination with each other. In an embodiment, the heat dissipation member 330 is omitted.

The shock absorbing member 340 is disposed under the heat dissipating member 330. The shock absorbing member 340 includes a first cushion layer 341 and a second cushion layer 342 that are spaced apart from each other. For example, the first cushion layer 341 and the second cushion layer 342 are spaced apart from each other in the second direction D2. Each of the first cushion layer 341 and the second cushion layer 342 partially overlaps the foldable area FA. An upper surface of the first cushion layer 341 directly contacts the first heat dissipation layer 331, and an upper surface of the second cushion layer 342 directly contacts the second heat dissipation layer 332.

The shock absorbing member 340 protects the display panel DP from external impacts. In addition, the shock absorbing member 340 includes a ductile material so that the display device DD can be easily folded. For example, the shock absorbing member 340 includes a foam material such as at least one of polyurethane foam or polystyrene foam, etc. These may be used alone or in combination with each other.

The insulating member 350 is disposed on the lower surface of the shock absorbing member 340. For example, the insulating member 350 is one of a film or a tape. The insulating member 350 prevents rattles from occurring in the display device DD.

Figure 5:
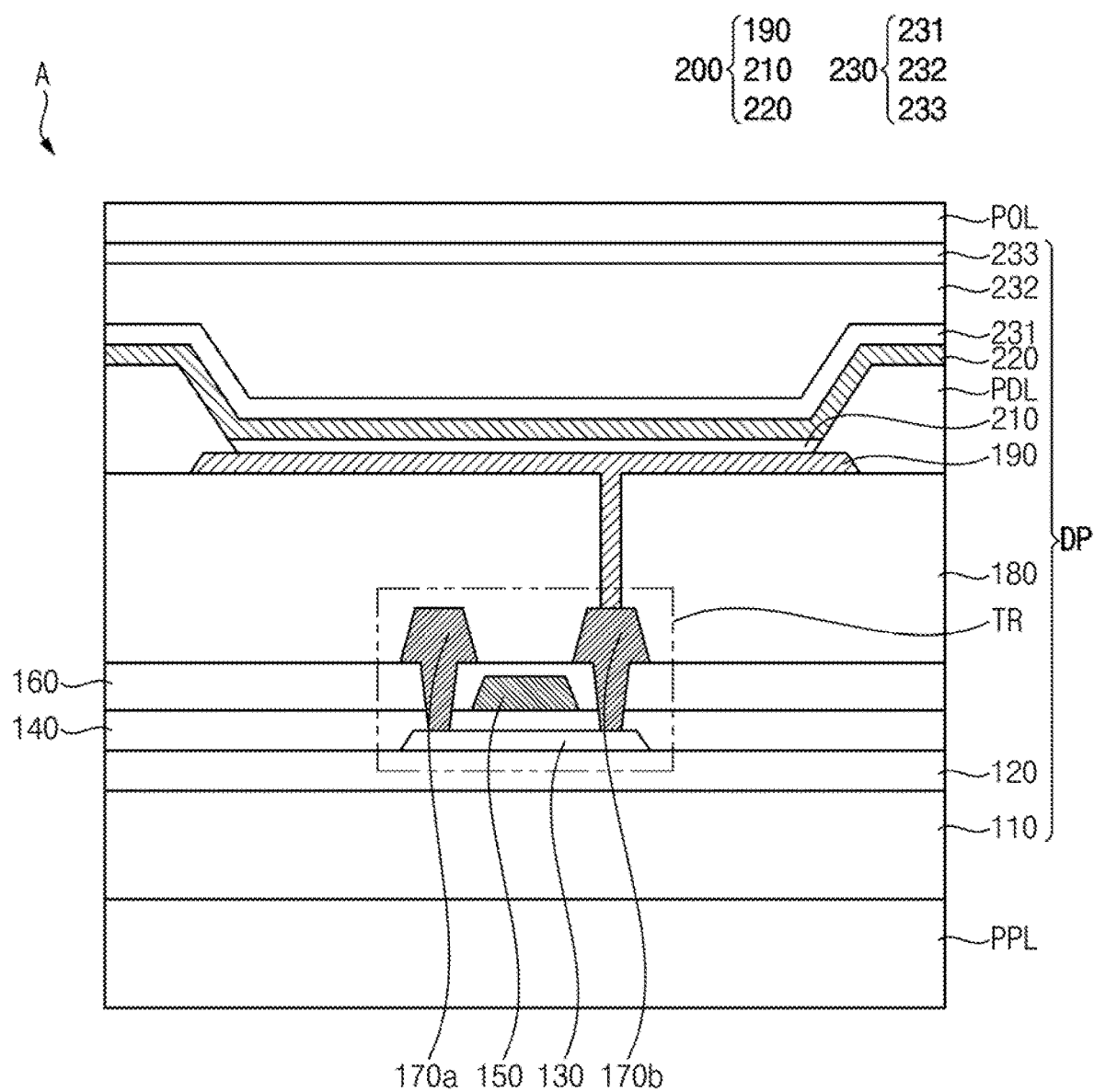
FIG. 5 is an enlarged cross-sectional view of area A of FIG. 4.

FIG. 5 is an enlarged cross-sectional view of area A of FIG. 4.

Referring to FIG. 5, the display panel DP of the display device DD according to an embodiment of the present disclosure includes a substrate 110, a buffer layer 120, a gate insulating layer 140, a transistor TR, an interlayer insulating layer 160, a planarization layer 180, a pixel defining layer PDL, a light emitting element 200, and an encapsulation layer 230.

The transistor TR includes an active layer 130, a gate electrode 150, a source electrode 170a, and a drain electrode 170b. The light emitting element 200 includes a lower electrode 190, a light emitting layer 210, and an upper electrode 220, and the encapsulation layer 230 includes a first thin film encapsulation layer 231, a second thin film encapsulation layer 232, and a third thin film encapsulation layer 233.

A panel protection layer PPL is disposed on the lower surface of the substrate 110. The panel protection layer PPL protects a lower portion of the display panel DP. The panel protection layer PPL includes a flexible plastic material. For example, the panel protection layer PPL includes polyethylene terephthalate, etc. However, materials included in the panel protection layer PPL are not necessarily limited thereto, and the panel protection layer PPL may include other flexible plastic materials.

The substrate 110 includes a one of transparent material or an opaque material. In an embodiment, the substrate 110 includes a flexible transparent resin. An example of a transparent resin that can be used as the substrate 110 is a polyimide. In an embodiment, the substrate 110 is at least one of a quartz substrate, a synthetic quartz substrate, a calcium fluoride substrate, a soda-lime glass substrate, or an alkali-free glass substrate, etc. These may be used alone or in combination with each other.

The buffer layer 120 is disposed on the substrate 110. The buffer layer 120 prevents diffusion of metal atoms or impurities from the substrate 110 into the transistor TR. The buffer layer 120 includes an inorganic material such as at least one of silicon oxide or silicon nitride, etc. These may be used alone or in combination with each other.

The active layer 130 is disposed on the buffer layer 120. The active layer 130 includes at least one of a metal oxide semiconductor, an inorganic semiconductor such as amorphous silicon or poly silicon, or an organic semiconductor. The active layer 130 includes a source region, a drain region, and a channel region positioned between the source region and the drain region.

The gate insulating layer 140 is disposed on the buffer layer 120. The gate insulating layer 140 covers the active layer 130 on the substrate 110 and has a substantially flat upper surface without creating a step around the active layer 130. In an embodiment, the gate insulating layer 140 covers the active layer 130 on the substrate 110 and is conformally formed along the profile of the active layer 130 with a uniform thickness. The gate insulating layer 140 includes at least one of silicon oxide ("$SiO_x$"), silicon nitride ("$SiN_x$"), silicon carbide ("$SiC_x$"), silicon oxynitride ("$SiO_xN_y$"), or silicon oxycarbide ("$SiO_xC_y$"), etc. These may be used alone or in combination with each other.

The gate electrode 150 is disposed on the gate insulating layer 140. The gate electrode 150 overlaps the channel region of the active layer 130. The gate electrode 150 includes at least one of a metal, an alloy, a metal nitride, a conductive metal oxide, or a transparent conductive material, etc. These may be used alone or in combination with each other.

The interlayer insulating layer 160 is disposed on the gate insulating layer 140. The interlayer insulating layer 160 covers the gate electrode 150 on the substrate 110 and has a substantially flat upper surface without creating a step around the gate electrode 150. In an embodiment, the interlayer insulating layer 160 covers the gate electrode 150 on the substrate 110 and is conformally formed along the profile of the gate electrode 150 with a uniform thickness. The interlayer insulating layer 160 includes at least one of silicon oxide, silicon nitride, silicon carbide, silicon oxynitride, or silicon oxycarbide, etc. These may be used alone or in combination with each other.

The source electrode 170a and the drain electrode 170b are disposed on the interlayer insulating layer 160. The source electrode 170a is connected to the source region of the active layer 130 through a contact hole formed by removing a first portion of the gate insulating layer 140 and the interlayer insulating layer 160, and the drain electrode 170b is connected to the drain region of the active layer 130 through a contact hole formed by removing a second portion of the gate insulating layer 140 and the interlayer insulating layer 160. Each of the source electrode 170a and the drain electrode 170b includes at least one of a metal, an alloy, a metal nitride, a conductive metal oxide, or a transparent conductive material, etc. These may be used alone or in combination with each other.

Accordingly, the transistor TR, which includes the active layer 130, the gate electrode 150, the source electrode 170a, and the drain electrode 170b, is disposed in the display area DA on the substrate 110.

The planarization layer 180 is disposed on the interlayer insulating layer 160. The planarization layer 180 covers the source electrode 170a and the drain electrode 170b. The planarization layer 180 includes one of an organic material or an inorganic material. In an embodiment, the planarization layer 180 includes an organic material. For example, the planarization layer 180 includes an organic material such as at least one of a polyimide-based resin, a photoresist, a polyacryl-based resin, a polyamide-based resin, or a siloxane-based resin, etc. These may be used alone or in combination with each other.

The lower electrode 190 is disposed on the planarization layer 180. The lower electrode 190 is connected to the drain electrode 170b through a contact hole formed by removing a portion of the planarization layer 180. The lower electrode 190 includes at least one of a metal, an alloy, a metal nitride, a conductive metal oxide, or a transparent conductive material, etc. These may be used alone or in combination with each other.

The pixel defining layer PDL is disposed on the planarization layer 180. An opening that exposes a part of the lower electrode 190 is formed in the pixel defining layer PDL. The pixel defining layer PDL covers an edge region of the lower electrode 190. The pixel defining layer PDL includes one of an organic material or an inorganic material. For example, the pixel defining layer PDL includes an organic material such as at least one of a polyimide-based resin, a photoresist, a polyacrylic resin, a polyamide-based resin, or a siloxane-based resin, etc. These may be used alone or in combination with each other.

The light emitting layer 210 may be disposed on the lower electrode 190. The light emitting layer 210 is disposed on part of the lower electrode 190 that is exposed by the opening. The light emitting layer 210 of formed of at least one light emitting materials that can emit one of red light, green light, or blue light. In an embodiment, the light emitting layer 210 is formed by stacking a plurality of light emitting materials that can generating different colors, such as red light, green light, and blue light, to emit white light.

The upper electrode 220 is disposed on the pixel defining layer PDL and the light emitting layer 210. The upper electrode 220 is disposed in the entire display area DA shown in FIG. 1. The upper electrode 220 includes at least one of a metal, an alloy, a metal nitride, a conductive metal oxide, or a transparent conductive material, etc. These may be used alone or in combination with each other.

Accordingly, the light emitting element 200, which includes the lower electrode 190, the light emitting layer 210, and the upper electrode 220, is disposed on the substrate 110 in the display area DA.

The first thin film encapsulation layer 231 is disposed on the upper electrode 220. The first thin film encapsulation layer 231 prevents the light emitting layer 210 from deteriorating due to penetration of moisture, oxygen, etc. In addition, the first thin film encapsulation layer 231 protects the display panel DP from external impacts. The first thin film encapsulation layer 231 includes flexible inorganic materials.

The second thin film encapsulation layer 232 is disposed on the first thin film encapsulation layer 231. The second thin film encapsulation layer 232 increases flatness of the display panel DP and protects the display panel DP. The second thin film encapsulation layer 232 includes flexible organic materials.

The third thin film encapsulation layer 233 is disposed on the second thin film encapsulation layer 232. The third thin film encapsulation layer 233, together with the first thin film encapsulation layer 231, prevents the light emitting layer 210 from deteriorating due to penetration of moisture, oxygen, etc. In addition, the third thin film encapsulation layer 233 protects the display panel DP from external shocks together with the first thin film encapsulation layer 231 and the second thin film encapsulation layer 232. The third thin film encapsulation layer 233 includes a flexible inorganic material.

However, although the display device DD according to an embodiment described with reference to FIGS. 4 and 5 is limited to an organic light emitting display device ("OLED"), embodiments of the present disclosure are not necessarily limited thereto. For example, in other embodiments, the display device DD includes a liquid crystal display device ("LCD"), a field emission display device ("FED"), a plasma display device ("PDP"), an electrophoretic display device ("EPD"), an inorganic light emitting display device ("ILED"), or a quantum dot display device.

Figure 6:
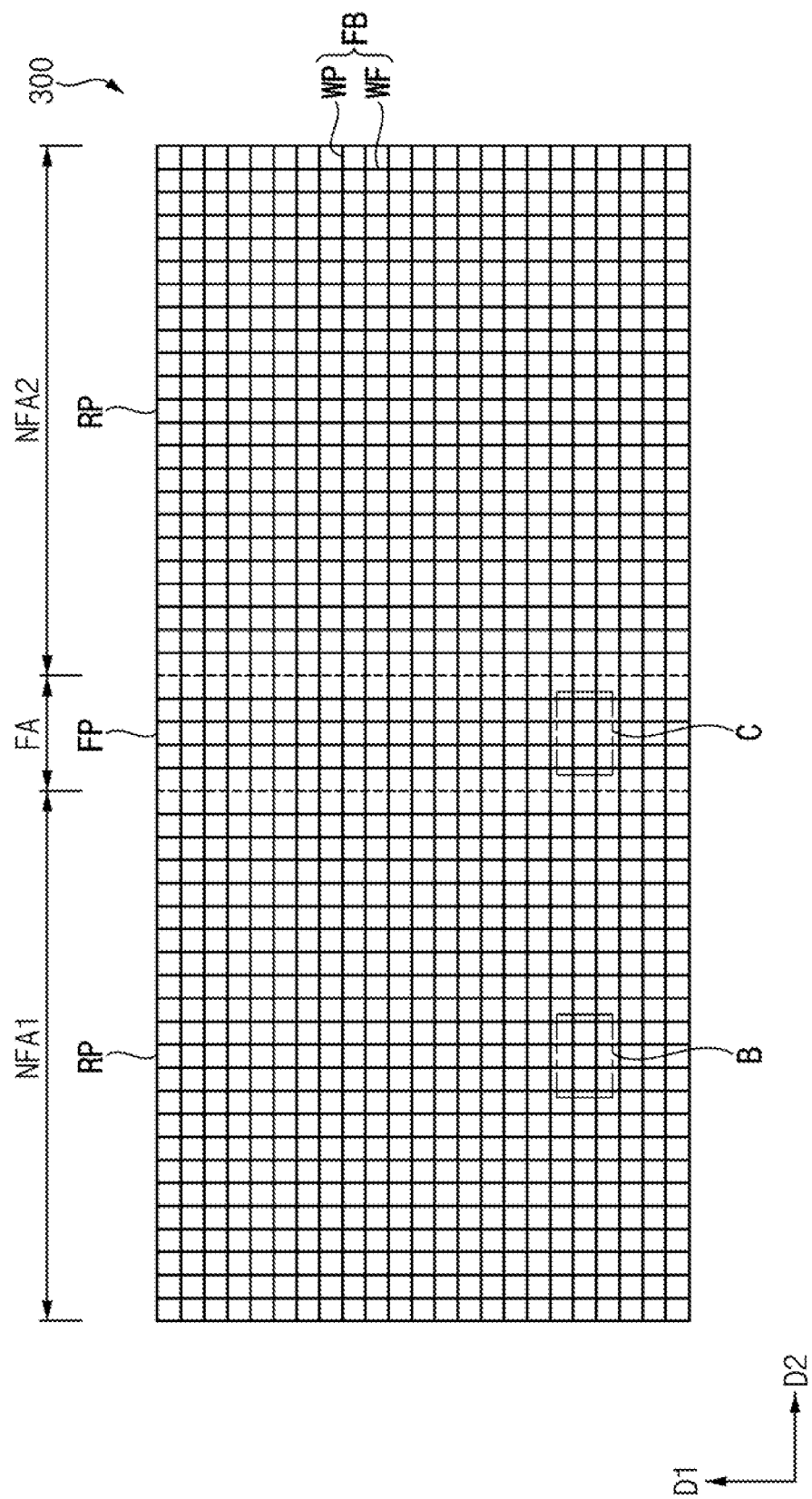
FIG. 6 is an enlarged plan view of a first support member of a display device of FIG. 4.
Figure 7:
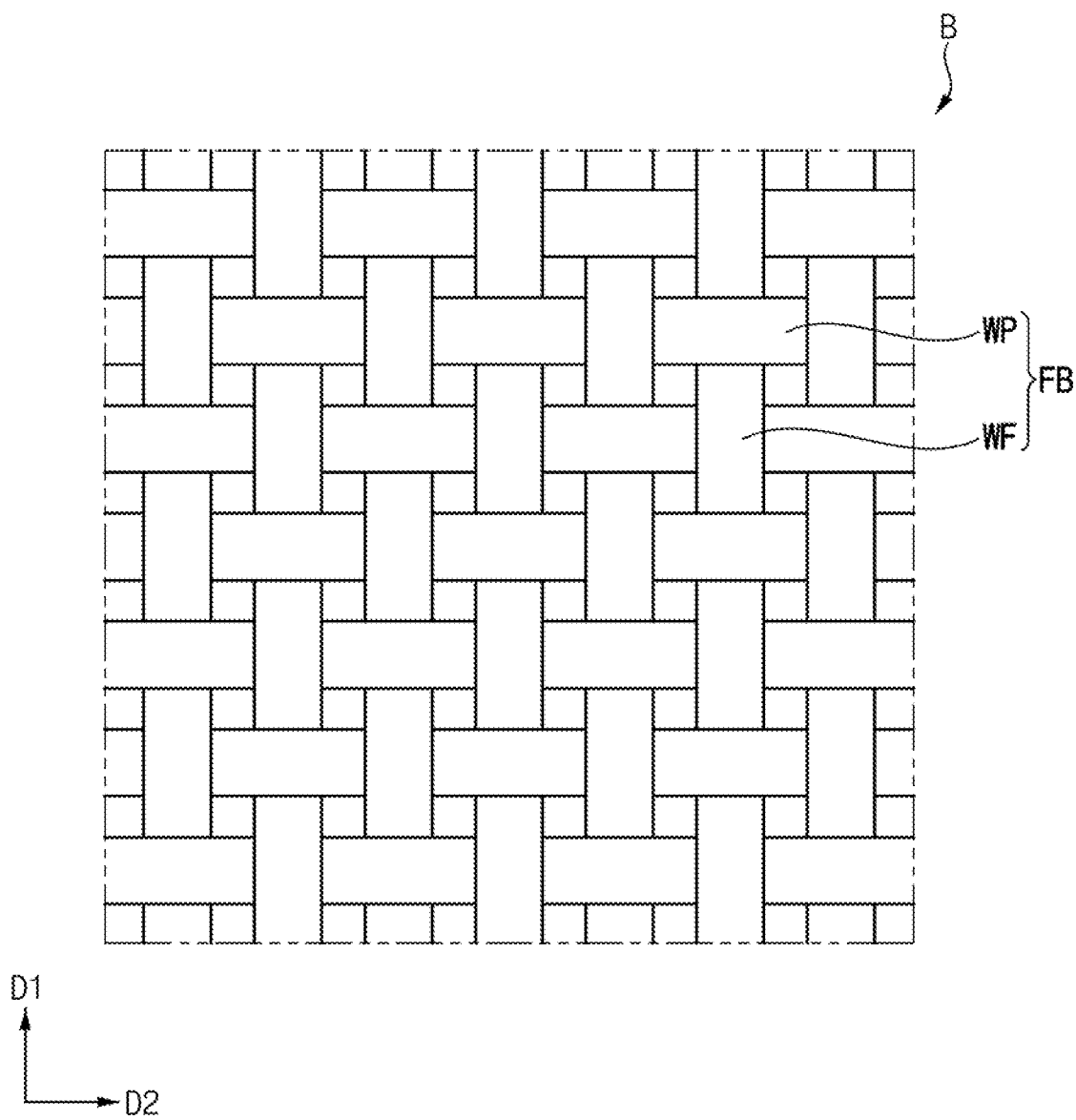
FIG. 7 is an enlarged plan view of area B of FIG. 6.
Figure 8:
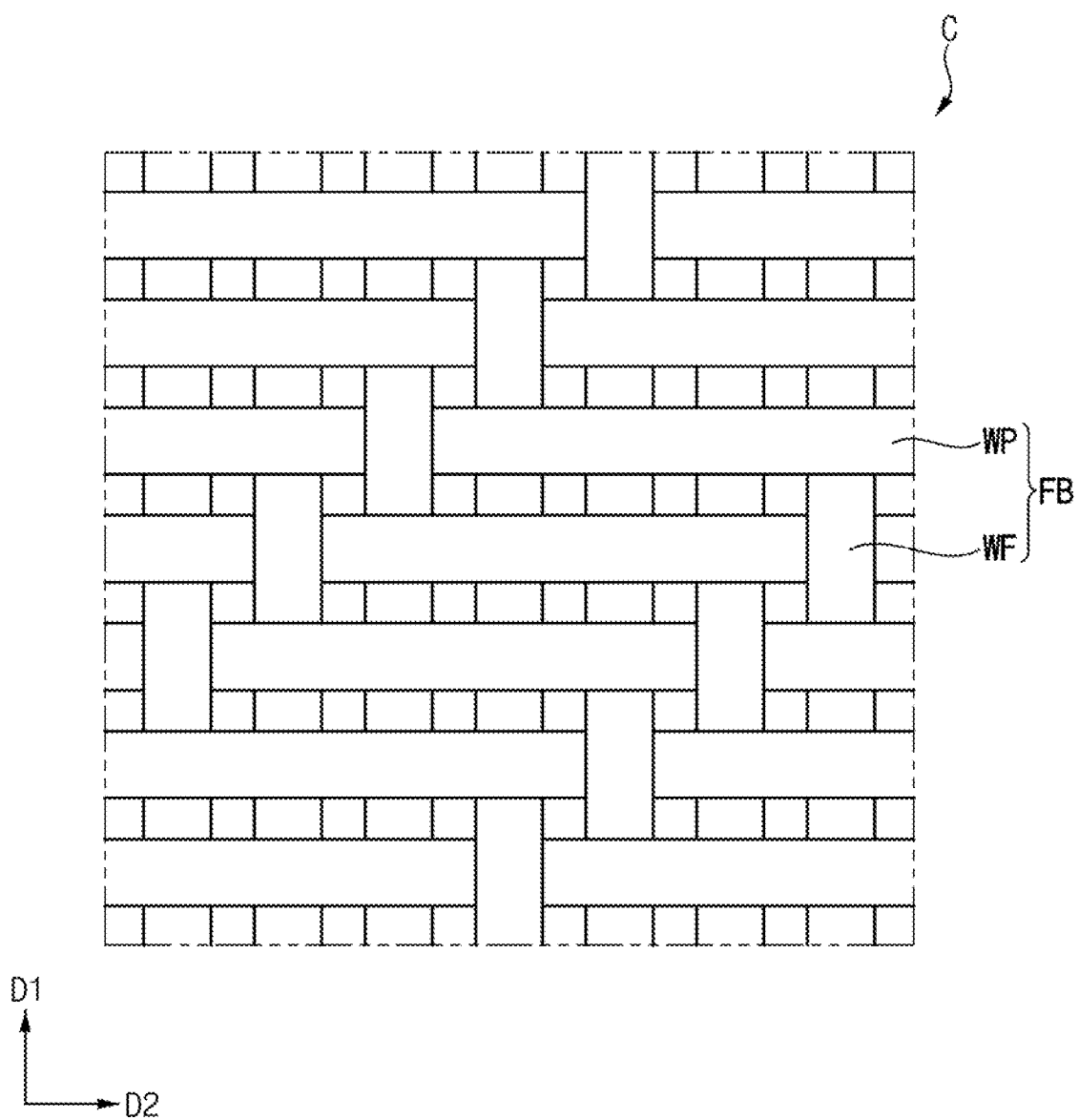
FIG. 8 is an enlarged plan view of area C of FIG. 6.
Figure 9:
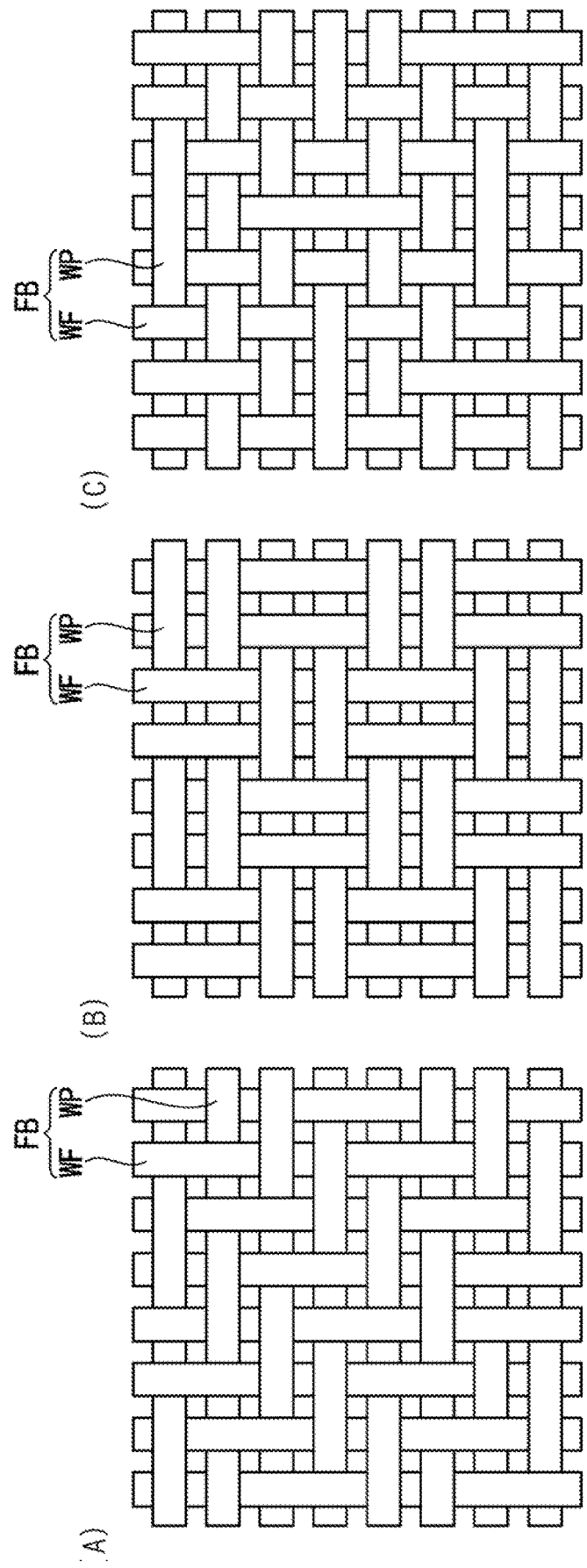
FIG. 9 illustrates a method of weaving a fabric in a first support member of FIG. 6.

FIG. 6 is an enlarged plan view of a first support member of a display device of FIG. 4. FIG. 7 is an enlarged plan view of area B of FIG. 6. FIG. 8 is an enlarged plan view of area C of FIG. 6. FIG. 9 is a plan view illustrating examples of a method of weaving a fabric included in the first support member of FIG. 6.

Referring to FIGS. 6, 7, and 8, in an embodiment, the first support member 300 of the display device DD includes a fabric FB. The fabric FB of the first support member 300 includes a flexible portion FP that overlaps the foldable area FA and a rigid portion RP that overlaps the non-foldable areas NFA1 and NFA2. The fabric FB has substantially the same shape as the first support member 300.

In an embodiment, the fabric FB of the first support member 300 includes a plurality of weft yarns WF and a plurality of warp yarns WP that extend across the weft yarns. In an embodiment, the weft yarns WF and the warp yarns WP are composed of yarn.

An extension direction of each of the weft yarns WF and the warp yarns WP of the flexible portion FP is the same as an extension direction of each of the weft yarns WF and the warp yarns WP of the rigid portion RP. In an embodiment, each of the weft yarns WF of the flexible portion FP and the rigid portion RP extend in the first direction D1, and each of the warp yarns WP of the flexible portion FP and the rigid portion RP extend in the second direction D2. For example, the first direction D1 is perpendicular to the second direction D2. In an embodiment, the extension direction of at least one of the weft yarns WF and the warp yarns WP of the flexible portion FP differs from the extension direction of at least one of the weft yarns WF and the warp yarns WP of the rigid portion RP. A detailed description of this will be provided below.

In an embodiment, the flexible portion FP of the first support member 300 is woven differently from the rigid portion RP of the first support member 300. For example, the flexible portion FP of the first support member 300 is woven to be flexible, and the rigid portion RP of the first support member 300 is woven to be rigid. In an embodiment, the flexible portion FP of the first support member 300 is woven to be flexible, and the rigid portion RP of the first support member 300 is woven to be less flexible than the flexible portion FP.

The fabric FB of the first support member 300 can be manufactured by twisting the weft yarns WF and the warp yarns WP through various methods. In an embodiment, each of the flexible portion FP and the rigid portion RP of the first support member 300 is woven with at least one of a plain weave, a twill weave, a satin weave, a basket weave, or a mock leno weave. The twill weave is shown in (A) of FIG. 9, the basket weave is shown in (B) of FIG. 9, and the mock leno weave is shown in (C) of FIG. 9. However, embodiments of the present disclosure are not necessarily limited thereto, and in other embodiments, each of the flexible portion FP and the rigid portion RP of the first support member 300 is woven by a different method.

In an embodiment, each of the flexible portion FP and the rigid portion RP of the first support member 300 is woven by one weaving method. In an embodiment, the flexible portion FP of the first support member 300 is woven in different ways using two or more methods, according to positions.

In an embodiment, the rigid portion RP of the first support member 300 is woven in a plain weave, shown in FIG. 7, and the flexible portion FP of the first support member 300 is woven in a satin weave, shown in FIG. 8. However, embodiments of the present disclosure are not necessarily limited thereto.

In a plain weave, warp yarns and weft yarns alternately cross each other up and down. In a plain weave, intersection points where the warp yarns and the weft yarns intersect form a lattice pattern.

In a twill weave, warp yarns and weft yarns cross over two or more yarns in succession, so that intersection points where the warp yarns and the weft yarns intersect form in an oblique direction.

The satin weave has a structure in which weft yarns pass over four or more warp yarns and go under one of the warp yarns to form fewer intersections.

In the basket weave, two or more warp yarns and weft yarns are grouped to form a plain weave like one yarn.

The woolen weave is formed like the plain weave by collecting a plurality of yarns and using the plurality of yarns as warp yarns and weft yarns.

The more intersection points where warp yarns and weft yarns cross each other, the harder is the fabric. In contrast, as the number of intersection points where the warp yarns and the weft yarns cross each other increases, the elasticity of the fabric increases. Therefore, stretchability and elasticity increase respectively for the satin weave, the twill weave, and the plain weave.

The fabric FB of the first support member 300 includes at least one of glass fiber, carbon fiber, or metal fiber, etc. These may be used alone or in combination with each other. For example, each of the weft yarns WF and the warp yarns WP of the fabric FB uses at least one of glass fiber, carbon fiber, or metal fiber, etc. When at least one of the weft yarns WF or the warp yarns WP uses a metal fiber, the fabric FB can perform an electromagnetic interference ("EMI") shielding function and/or a heat dissipation function.

In an embodiment, the fabric FB of the first support member 300 includes only metal fiber. For example, the fabric FB of the first support member 300 is formed with a desired shape through a forging operation or a press operation. Accordingly, the surface quality of the display device DD in the non-foldable areas NFA1 and NFA2 is increased.

In an embodiment, the weft yarns WF and the warp yarns WP of the fabric FB use the same fiber. In an embodiment, the weft yarns WF and the warp yarns WP of the fabric FB use different fibers. For example, some portions of the weft yarns WF and the warp yarns WP of the fabric FB use one of glass fiber, carbon fiber, and metal fiber, and other portions of the weft yarns WF and the warp yarns WP of the fabric FB use different fibers from the above portion.

In an embodiment, the rigid portion RP of the first support member 300 includes fiber reinforced plastic ("FRP"). For example, the rigid portion RP of the first support member 300 includes one of carbon fiber reinforced plastic ("CFRP") or glass fiber reinforced plastic ("GFRP"). When the rigid portion RP of the first support member 300 includes fiber reinforced plastic, the surface quality of the display device DD is increased in the non-foldable areas NFA1 and NFA2 and that formation of a hole that passes through the rigid portion RP, such as a hole that accommodates a camera module, is facilitated.

For example, a polymer resin is impregnated into the rigid portion RP of the first support member 300 to form fiber reinforced plastic. For example, the polymer resin includes at least one of an epoxy-based resin, an acrylic-based resin, a polyamide-based resin, or a siloxane-based resin, etc. These may be used alone or in combination with each other.

In an embodiment, the flexible portion FP of the first support member 300 does not include fiber reinforced plastic. In an embodiment, the flexible portion FP of the first support member 300 includes fiber reinforced plastic.

Each of the flexible portion FP and the rigid portion RP of the first support member 300 may have a single-layer structure or a multi-layer structure. In an embodiment, the number of layers in the flexible portion FP of the first support member 300 is equal to the number of layers in the rigid portion RP of the first support member 300. In an embodiment, the number of layers in the flexible portion FP of the first support member 300 differs from the number of layers in the rigid portion RP of the first support member 300.

A support member that has a lattice portion that overlaps a foldable area is disposed under a display panel to support the display panel of a foldable display device and assist folding of the display panel. However, when the support member is folded due to the curved shape of the lattice portion, creases can occur in the foldable display device. Accordingly, the surface quality of the foldable display device can deteriorate.

The display device DD according to an embodiment of the present disclosure includes the display panel DP that includes the foldable area FA and the non-foldable areas NFA1 and NFA2 adjacent to the foldable area FA, and the first support member 300 disposed under the display panel DP. The first support member 300 includes the fabric FB that includes the flexible portion FP that overlaps the foldable area FA, and the rigid portion RP that overlaps the non-foldable areas NFA1 and NFA2. The rigid portion RP is woven differently from the flexible portion FP, and contains fiber reinforced plastic. Accordingly, surface quality of the display device DD is increased. In addition, since the first support member 300 is formed of the fabric FB, the manufacturing process of the display device DD can be simplified.

Figure 10:
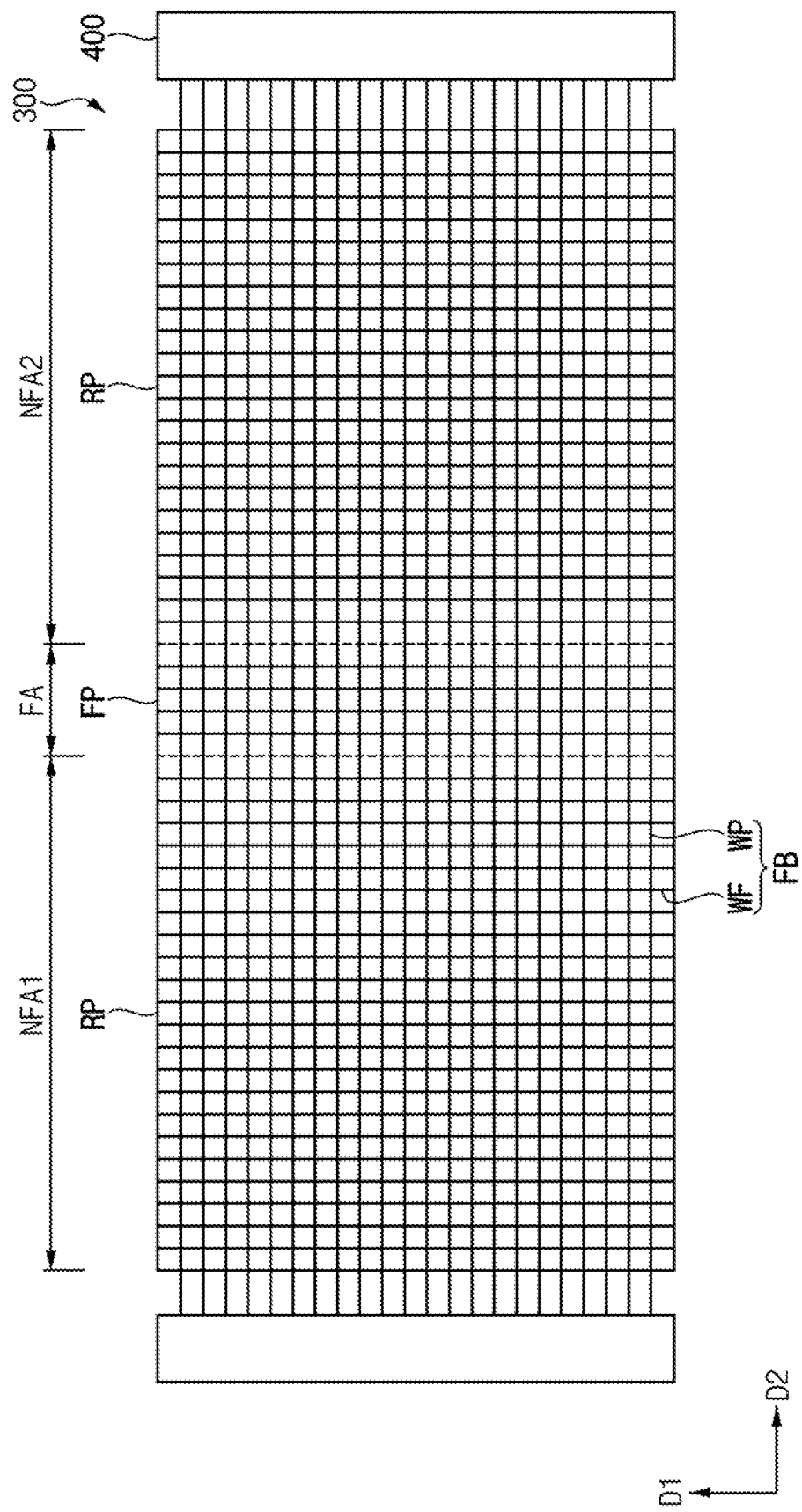
FIG. 10 is a plan view of a first support member and a fixing structure connected to a first support member of FIG. 6.

FIG. 10 is a plan view of a first support member and a fixing structure connected to a first support member of FIG. 6.

Referring to FIGS. 6 and 10, in an embodiment, the first support member 300 includes a fabric FB. The fabric FB of the first support member 300 includes a flexible portion FP that overlaps the foldable area FA and a rigid portion RP that overlaps the non-foldable areas NFA1 and NFA2. Hereinafter, descriptions that repeat those of the first support member 300 described with reference to FIGS. 6, 7, 8, and 9 will be omitted or simplified.

The fabric FB of the first support member 300 includes a plurality of weft yarns WF and a plurality of warp yarns WP that extend across the weft yarns. The weft yarns WF and the warp yarns WP are composed of yarn.

Each of the warp yarns WP extends out from the first support member 300. For example, each of the warp yarns WP extends along the second direction D2 and out from the first support member 300. For example, a portion of each of the warp yarns WP that extends out from the first support member 300 does not overlap the first support member 300.

In an embodiment, a fixing structure 400 is disposed adjacent to the first support member 300 and is connected to both ends of each of the warp yarns WP. Since the fixing structure 400 is connected to both ends of each of the warp yarns WP, the fixing structure 400 can pull the warp yarns WP. Accordingly, creases of the display device, such as the display device DD of FIG. 1, can be reduced. For example, the fixing structure 400 includes a spring, etc. However, embodiments of the present disclosure are not necessarily limited thereto, and in other embodiments, the fixing structure 400 includes other configurations.

Figure 11:
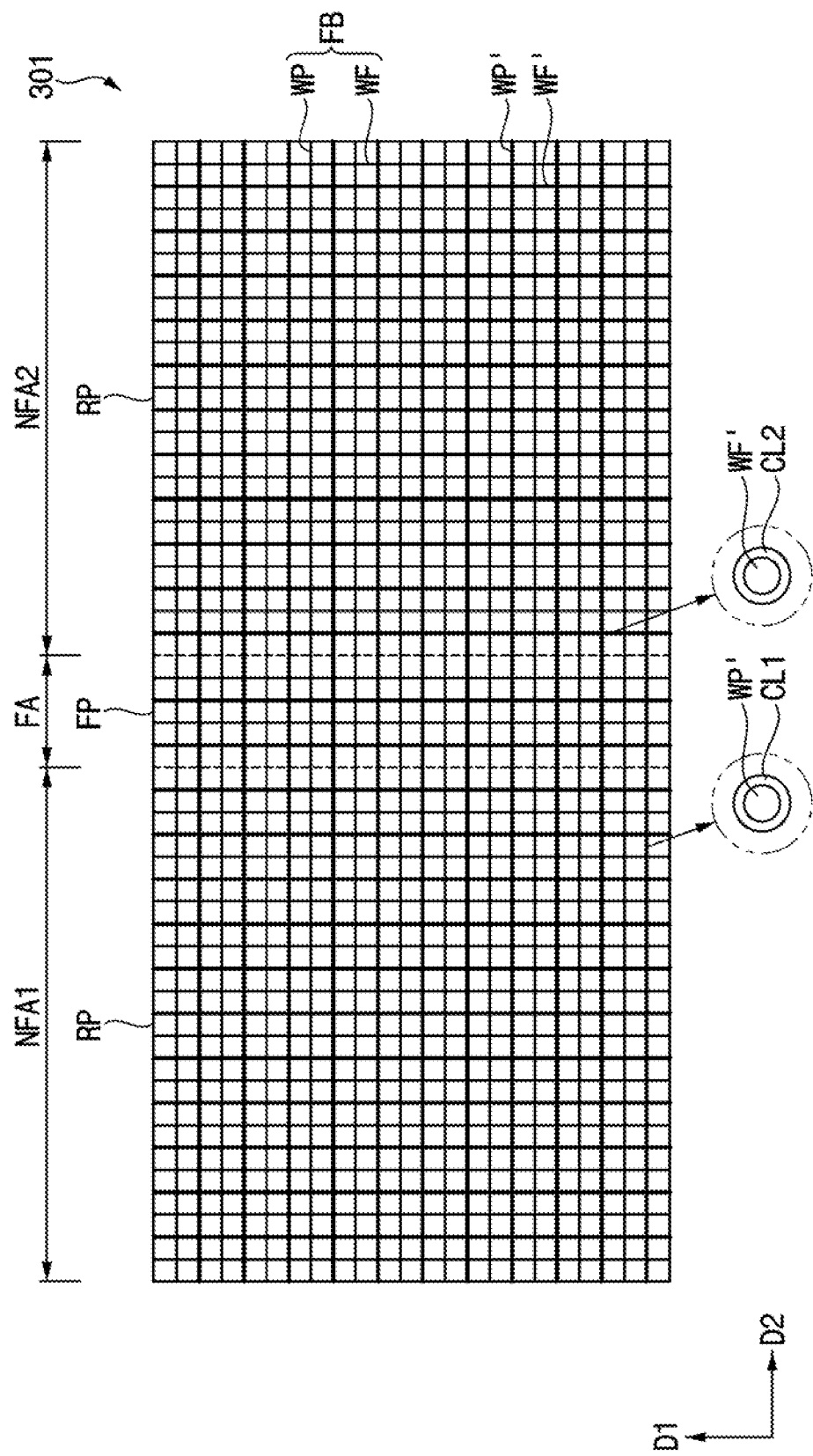
FIG. 11 is a plan view of a first support member of a display device according to an embodiment of the present disclosure.

FIG. 11 is a plan view of a first support member of a display device according to an embodiment of the present disclosure.

Referring to FIGS. 6 and 11, in an embodiment, a first support member 301 includes a fabric FB. The fabric FB of the first support member 301 includes a flexible portion FP that overlaps the foldable area FA and a rigid portion RP that overlaps the non-foldable areas NFA1 and NFA2. Hereinafter, descriptions that repeat those of the first support member 300 described with reference to FIGS. 6, 7, 8, and 9 will be omitted or simplified.

The fabric FB of the first support member 301 includes a plurality of weft yarns WF and a plurality of warp yarns WP that extend across the weft yarns. The weft yarns WF and the warp yarns WP are composed of yarn.

As described above, the fabric FB of the first support member 301 includes at least one of a glass fiber, a carbon fiber, or a metal fiber, etc. These may be used alone or in combination with each other. For example, each of the weft yarns WF and the warp yarns WP of the fabric FB uses one or more of a glass fiber, a carbon fiber, or a metal fiber, etc.

In an embodiment, the fabric FB further includes a coating layer that surrounds at least one weft yarn or at least one warp yarn using a metal fiber and includes a polymer. For example, some of the fabric FB further includes a first coating layer CL1 that includes a polymer and surrounds each of the weft yarns WF' using metal fiber. In addition, the fabric FB further includes a second coating layer CL2 that includes a polymer and surrounds each of the warp yarns WP' using metal fiber. For example, the weft yarns WF' surrounded by the first coating layer CL1 and the warp yarns WP' surrounded by the second coating layer CL2 can be used as a digitizer or a pressure sensor. For example, the polymer of each of the first coating layer CL1 and the second coating layer CL2 includes at least one of an epoxy-based resin, an acrylic-based resin, a polyamide-based resin, or a siloxane-based resin, etc. These may be used alone or in combination with each other.

Figure 12:
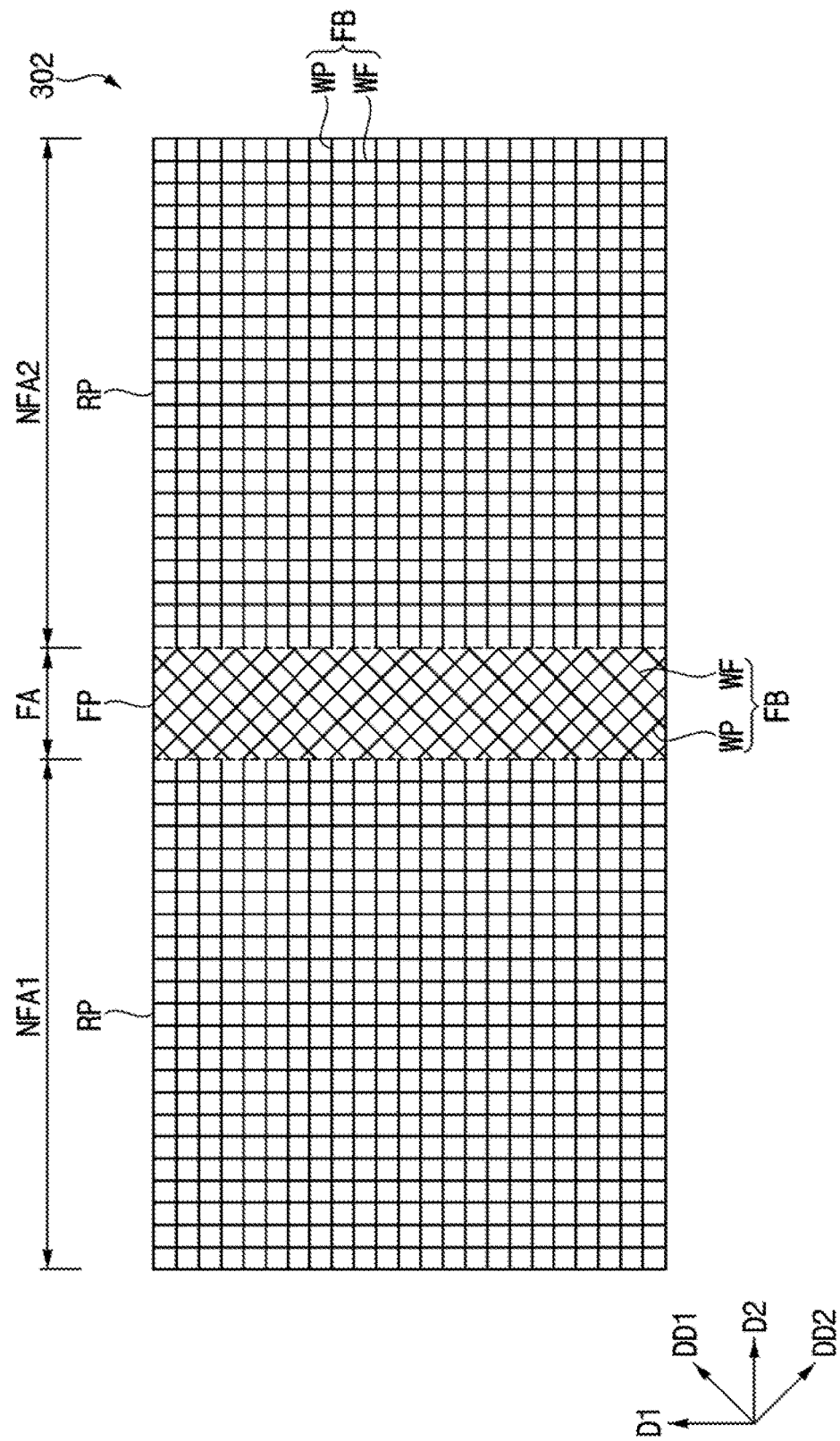
FIG. 12 is a plan view of a first support member of a display device according to an embodiment of the present disclosure.

FIG. 12 is a plan view of a first support member of a display device according to an embodiment of the present disclosure.

Referring to FIGS. 6 and 12, in an embodiment, a first support member 302 includes a fabric FB. The fabric FB of the first support member 302 includes a flexible portion FP that overlaps the foldable area FA and a rigid portion RP that overlaps the non-foldable areas NFA1 and NFA2. Hereinafter, descriptions that repeat those of the first support member 300 described with reference to FIGS. 6, 7, 8, and 9 will be omitted or simplified.

The fabric FB of the first support member 302 includes a plurality of weft yarns WF and a plurality of warp yarns WP that extend across the weft yarns. The weft yarns WF and the warp yarns WP are composed of yarn.

An extension direction of at least one of the weft yarns WF and/or the warp yarns WP of the flexible portion FP differs from an extension direction of at least one of the weft yarns WF and/or the warp yarns WP of the rigid portion RP.

In an embodiment, each of the weft yarns WF of the fabric FB in the rigid portion RP extends in the first direction D1, and each of the warp yarns WP of the fabric FB in the rigid portion RP extends in the second direction D2. Each of the weft yarns WF of the fabric FB in the flexible portion FP extends in a first diagonal direction DD1 between the first and second directions D1 and D2, and each of the warp yarns WP of the fabric FB in the flexible portion FP may extends in a second diagonal direction DD2 that crosses the first diagonal direction DD1. In an embodiment, the second diagonal direction DD2 is perpendicular to the first diagonal direction DD1.

In an embodiment, each of the weft yarns WF of the fabric FB in the flexible portion FP extends in the first direction D1, each of the warp yarns WP of the fabric FB in the flexible portion FP extends in the second direction D2, each of the weft yarns WF of the fabric FB in the rigid portion RP extends in the first diagonal direction DD1, and each of the warp yarns WP of the fabric FB in the rigid portion RP extends in the second diagonal direction DD2.

Figure 13:
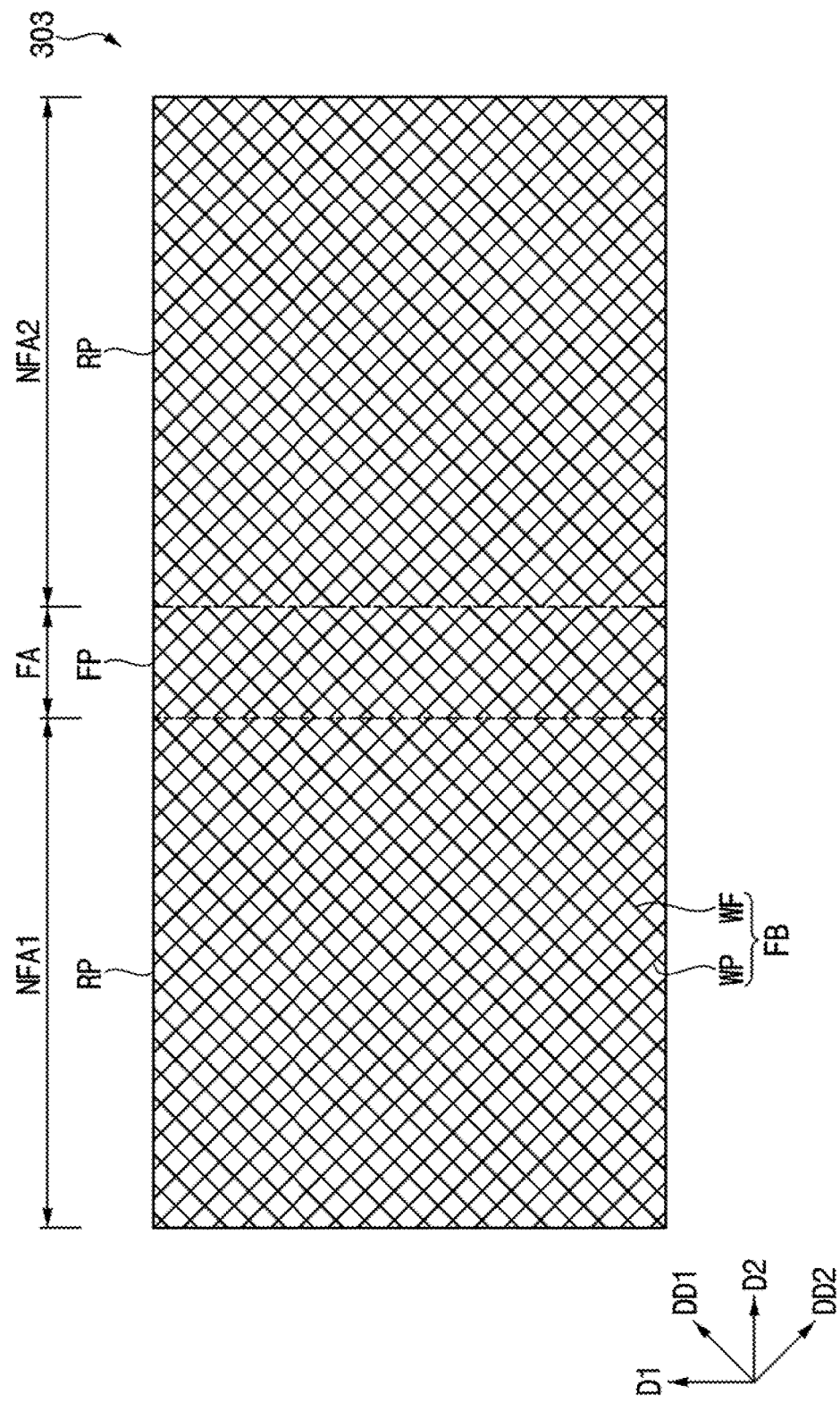
FIG. 13 is a plan view of a first support member of a display device according to an embodiment of the present disclosure.

FIG. 13 is a plan view of a first support member of a display device according to an embodiment of the present disclosure.

Referring to FIGS. 6 and 13, in an embodiment, a first support member 303 includes a fabric FB. The fabric FB of the first support member 303 includes a flexible portion FP that overlaps the foldable area FA and a rigid portion RP that overlaps the non-foldable areas NFA1 and NFA2. Hereinafter, descriptions that repeat those of the first support member 300 described with reference to FIGS. 6, 7, 8, and 9 will be omitted or simplified.

The fabric FB of the first support member 303 includes a plurality of weft yarns WF and a plurality of warp yarns WP that extend across the weft yarns. The weft yarns WF and the warp yarns WP are composed of yarn.

An extension direction of each of the weft yarns WF and the warp yarns WP of the flexible portion FP is the same as an extension direction of each of the weft yarns WF and the warp yarns WP of the rigid portion RP. In an embodiment, each of the weft yarns WF of the flexible portion FP and the rigid portion RP extends in the first diagonal direction DD1, and each of the warp yarns WP of the flexible portion FP and the rigid portion RP extends in the second diagonal direction DD2.

Embodiments of the present disclosure can be incorporated into various display devices. For example, embodiments of the present disclosure can be incorporated into various display devices, such as display devices for vehicles, ships and aircraft, portable communication devices, display devices for exhibition or information transmission, medical display devices, etc.

The foregoing is illustrative of embodiments and is not to be construed as limiting thereof. Although embodiments have been described, those skilled in the art will readily appreciate that many modifications are possible in embodiments without materially departing from the novel teachings and advantages of the present inventive concept. Accordingly, all such modifications are intended to be included within the scope of the present inventive concept as defined in the claims. Therefore, it is to be understood that the foregoing is illustrative of embodiments and is not to be construed as limited to the disclosed embodiments, and that modifications to the disclosed embodiments, as well as other embodiments, are intended to be included within the scope of the appended claims.

What is claimed is:

1. A display device, comprising:
   a display panel that includes a foldable area and a non-foldable area adjacent to the foldable area; and
   a first support member disposed under the display panel, wherein the first support member includes a fabric that includes:
   a flexible portion that overlaps the foldable area; and
   a rigid portion that overlaps the non-foldable area, wherein the rigid portion is woven differently from the flexible portion and contains fiber reinforced plastic,
   wherein,
   the rigid portion includes first weft yarns and first warp yarns each arranged with a first pitch,
   at least a central region of the flexible portion includes second weft yarns and second warp yarns each arranged with a second pitch substantially the same as the first pitch, wherein the flexible portion does not contain fiber reinforced plastic; and the first and second warp yarns and the first and second weft yarns use the same fiber.

2. The display device of claim 1, wherein the weft yarns and the warp yarns include yarn.

3. The display device of claim 2, wherein an extension direction of at least one of the weft yarns or the warp yarns of the flexible portion differs from an extension direction of at least one of the weft yarns or the warp yarns of the rigid portion.

4. The display device of claim 3, wherein each of the weft yarns of the rigid portion extends in a first direction and each of the warp yarns of the rigid portion extends in a second direction that crosses the first direction, and
wherein each of the weft yarns of the flexible portion extends in a first diagonal direction between the first direction and the second direction, and each of the warp yarns of the flexible portion extends in a second diagonal direction that crosses the first diagonal direction.

5. The display device of claim 2, wherein an extension direction of each of the weft yarns and the warp yarns of the flexible portion is a same direction as an extension direction of each of the weft yarns and the warp yarns of the rigid portion.

6. The display device of claim 5, wherein the foldable area has a folding line that extends in a first direction and the non-foldable area is adjacent to the foldable area in a second direction that crosses the first direction, and
wherein each of the weft yarns of the flexible portion and the rigid portion extends in a first diagonal direction between the first direction and the second direction, and each of the warp yarns of the flexible portion and the rigid portion extends in a second diagonal direction that crosses the first diagonal direction.

7. The display device of claim 2, wherein the fabric further includes:
a coating layer that surrounds at least one weft yarn or at least one warp yarn using a metal fiber and includes a polymer.

8. The display device of claim 2, further comprising:
a fixing structure disposed adjacent to the first support member and connected to both ends of each of the warp yarns.

9. The display device of claim 8, wherein the fixing structure includes a spring.

10. The display device of claim 1, wherein the fabric includes at least one of a glass fiber, a carbon fiber, or a metal fiber.

11. The display device of claim 1, wherein each of the flexible portion and the rigid portion has one of a single-layer structure or a multi-layer structure.

12. The display device of claim 1, wherein each of the flexible portion and the rigid portion is woven with at least one of a plain weave, a twill weave, or a satin weave, and the flexible portion is woven with at least one of a basket weave or a mock leno weave.

13. The display device of claim 1, wherein the flexible portion is woven in a satin weave and the rigid portion is woven in a plain weave.

14. The display device of claim 1, wherein the rigid portion includes one of a carbon fiber reinforced plastic or a glass fiber reinforced plastic.

15. The display device of claim 1, further comprising:
a second support member disposed under the first support member, wherein the second support member overlaps the non-foldable area and includes a first support layer and second support layer spaced apart from each other.

16. A display device, comprising:
a display panel that includes a foldable area and a non-foldable area adjacent to the foldable area; and
a first support member disposed under the display panel, wherein the first support member includes a fabric that includes:
a flexible portion that overlaps the foldable area; and
a rigid portion that overlaps the non-foldable area and contains fiber reinforced plastic,
wherein the flexible portion and the rigid portion are formed as different regions of a same continuous layer, the rigid portion includes yarns extending in two different first directions and the flexible portion includes yarns extending in two different second directions that are diagonal with respect to the first directions.

17. The display device of claim 16, wherein the fabric includes:
a plurality of weft yarns and a plurality of warp yarns that extend across the weft yarns, wherein the weft yarns and the warp yarns are composed of yarn.

18. The display device of claim 17, wherein an extension direction of at least one of the weft yarns or the warp yarns of the flexible portion differs from an extension direction of at least one of the weft yarns or the warp yarns of the rigid portion.

19. The display device of claim 16, wherein each of the flexible portion and the rigid portion is woven with at least one of a plain weave, a twill weave, a satin weave, a basket weave, or a mock leno weave.

20. The display device of claim 16, wherein the fabric includes at least one of a glass fiber, a carbon fiber, or a metal fiber.

* * * * *